(No Model.)
T. A. EDISON.
INCANDESCING CONDUCTOR FOR ELECTRIC LAMPS.
No. 287,520. Patented Oct. 30, 1883.
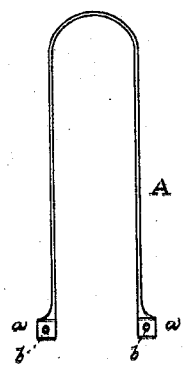
ATTEST:
E. C. Rowland,
INVENTOR,
Thomas A. Edison,
By Rich'd N. Dyer,
Atty.

UNITED STATES PATENT OFFICE.

THOMAS A. EDISON, OF MENLO PARK, NEW JERSEY, ASSIGNOR TO THE EDISON ELECTRIC LIGHT COMPANY, OF NEW YORK, N. Y.

INCANDESCING CONDUCTOR FOR ELECTRIC LAMPS.

SPECIFICATION forming part of Letters Patent No. 287,520, dated October 30, 1883.

Application filed November 9, 1882. (No model.)

*To all whom it may concern:*

Be it known that I, THOMAS A. EDISON, of Menlo Park, in the county of Middlesex and State of New Jersey, have invented a new and useful Improvement in Incandescing Conductors for Electric Lamps, (Case No. 511,) of which the following is a specification.

In my application No. 506 (Serial No. 76,378) are set forth various ways in which the incandescing conductors of electric lamps may be removably attached to the leading-in wires.

The object of my present invention is to so form the incandescing filament that such removable connections may be readily made, and be secure and durable and of good electrical conductivity. To do this I form small holes in the enlarged ends of a filament, and then electroplate such ends, preferably with copper, in such manner that the insides of the holes will be plated. By this means the strength of the ends is increased, the metal covering preventing the carbon from splitting when the hooks or other connecting devices attached to the ends of the leading-in wires are placed in the holes. Where screw-clamps attached to the leading-in wires are used, the screws would be passed through the holes, the copper giving mechanical strength and electrical conductivity to the connection.

In the accompanying drawing, forming a part hereof, a carbon filament embodying the invention is shown in elevation.

A is the flexible carbon filament, having enlarged ends $a\ a$, each provided with an aperture, $b$, such ends and the interior walls of such apertures being covered with a coating of electro-deposited metal. The apertures $b$ may be formed in any suitable manner either before or after carbonization.

I do not claim herein the invention of providing a carbon filament with plated ends or enlarged plated ends, since the same is covered by my application No. 23,810; and it is to be understood that all patentable features of invention described or shown but not claimed herein are reserved for protection by other patents, and have been or will be included in other applications for patents.

What I claim is—

The incandescing conductor of an electric lamp, having apertures in its enlarged ends, such ends and the interiors of such apertures being electroplated, substantially as and for the purpose set forth.

This specification signed and witnessed this 3d day of November, 1882.

THOMAS A. EDISON.

Witnesses:
H. W. SEELY,
EDWARD H. PYATT.